United States Patent
Lin et al.

(10) Patent No.: US 9,720,605 B2
(45) Date of Patent: Aug. 1, 2017

(54) METHOD FOR DYNAMICALLY ESTABLISHING TRANSLATION LAYER OF SOLID STATE DISK

(71) Applicant: QUANTA STORAGE INC., Taoyuan (TW)

(72) Inventors: Cheng-Yi Lin, Taoyuan (TW); Ying-Kai Yu, Taoyuan (TW); Yi-Long Hsiao, Taoyuan (TW)

(73) Assignee: QUANTA STORAGE INC., Taoyuan (TW)

(*) Notice: Subject to any disclaimer, the term of this patent is extended or adjusted under 35 U.S.C. 154(b) by 55 days.

(21) Appl. No.: 14/931,849

(22) Filed: Nov. 3, 2015

(65) Prior Publication Data
US 2016/0266818 A1    Sep. 15, 2016

(30) Foreign Application Priority Data
Mar. 11, 2015   (CN) .......................... 2015 1 0105384

(51) Int. Cl.
*G06F 3/06* (2006.01)
*G06F 12/02* (2006.01)

(52) U.S. Cl.
CPC .......... *G06F 3/0616* (2013.01); *G06F 3/0604* (2013.01); *G06F 3/0634* (2013.01); *G06F 3/0685* (2013.01); *G06F 3/0688* (2013.01); *G06F 12/0246* (2013.01); *G06F 2212/22* (2013.01); *G06F 2212/601* (2013.01); *G06F 2212/6012* (2013.01); *G06F 2212/7201* (2013.01); *G06F 2212/7203* (2013.01); *G06F 2212/7207* (2013.01)

(58) Field of Classification Search
None
See application file for complete search history.

(56) References Cited

U.S. PATENT DOCUMENTS

| | | | | |
|---|---|---|---|---|
| 2010/0115190 | A1* | 5/2010 | Cho | G06F 12/0246 711/103 |
| 2014/0122781 | A1* | 5/2014 | Smith | G06F 11/1441 711/103 |
| 2016/0259589 | A1* | 9/2016 | Zettsu | G06F 3/0634 |

* cited by examiner

*Primary Examiner* — Kevin Verbrugge
(74) *Attorney, Agent, or Firm* — Rabin & Berdo, P.C.

(57) ABSTRACT

A method for dynamically establishing a transition layer of a solid state disk (SSD). When a SSD is activated, the storage mode of the logical to physical (L2P) table is dynamically selected according to the state in the buffer memory of the SSD and the comparison between the capacity of the buffer memory and that of the L2P table. The establishing position of a flash translation layer (FTL) is suitably adjusted according to the selected storage mode such that the lifespan of the SSD can be prolonged.

12 Claims, 6 Drawing Sheets

METHOD FOR DYNAMICALLY ESTABLISHING TRANSLATION LAYER OF SOLID STATE DISK

This application claims the benefit of People's Republic of China application Serial No. 201510105384.8, filed Mar. 11, 2015, the subject matter of which is incorporated herein by reference.

BACKGROUND OF THE INVENTION

Field of the Invention

The invention relates in general to a solid state disk (SSD), and more particularly to a method for establishing a translation layer to manage a logical to physical (L2P) table when the SSD is activated.

Description of the Related Art

Solid state disk (SSD) is a storage device composed of NAND flash memory arrays. The flash memory is subjected to the erase times, and data is scattered to store in the flash memory arrays. The flash translation layer (FTL) is used to manage the correspondence relationship between the logical address of data and the physical address in which data is actually stored in the flash memory.

Referring to FIG. 1, a functional block diagram of an electronic device storage system 1 in the prior art is shown. The host 2 of the electronic device storage system 1, such as a computer, a mobile phone, includes a central processing unit (CPU) 3, which sends the logical address of the accessed data to the SSD 5 connected to the transmission interface 4. The SSD 5 includes a controller 6. The controller 6, in conjunction with a buffer memory 7, receives the logical address of the accessed data from the host 2, accesses data from the physical address of the flash memory array 8 corresponding to the logical address of the accessed data, and sends the accessed data to the DRAM 9 for the host 2 to use.

In order to manage the relationship between the logical address of data and the physical address in which data is actually stored in the flash memory array 8, a flash translation layer (FTL) is established for the storage and management of a logical to physical table (L2P) table. When the SSD 5 is activated, management data of each data block is read from the flash memory array 8 to form an L2P table storing the correspondence relationship between the logical address of data and the physical address of the accessed data. When the SSD 5 is initialized, the firmware stored in the flash memory array 8 of the SSD 5 already pre-determines that the FTL is established in the buffer memory 7 or the flash memory array 8. Since the access speed of the dynamic random access memory (DRAM) is 10 times faster than that of the flash memory, the buffer memory 7 is a DRAM type buffer memory. Thus, in the prior art, the FTL is preferably established in the buffer memory 7 of the SSD 5.

Since the FTL is preferably established in the buffer memory 7 of the SSD 5 in the prior art, the FTL cannot be established once the buffer memory 7 is broken or partially damaged. If the establishing position of FTL cannot be changed, the SSD 5 can no longer use the FTL to manage the L2P table of the accessed data. To the worse, the SSD 5 will fail. If the FTL of the SSD 5 is established in the flash memory array having a slower access speed, the establishing position of the FTL cannot be adjusted according to the state of the electronic device storage system, and the access speed of the SSD cannot be increased. Therefore, the SSD still has any problems to resolve when it comes to the establishment method of the translation layer.

SUMMARY OF THE INVENTION

According to an object of the present invention, a method for dynamically establishing translation layer of an SSD is provided. When an SSD is activated, the storage mode of the logical to physical (L2P) table is dynamically selected according to the state in the buffer memory of the SSD and the comparison between the capacity of the buffer memory and that of the L2P table. The establishing position of the flash translation layer (FTL) is suitably adjusted according to the selected storage mode such that the lifespan of the SSD can be prolonged.

To achieve the above object of the present invention, a method for dynamically establishing a translation layer of an SSD is disclosed in a first embodiment of the present invention. An SSD is activated. A memory capacity of a buffer memory is obtained. A memory capacity of a flash memory array is obtained to form an estimated capacity required for storing the L2P table. The pre-determined capacity of the buffer memory for storing the L2P table is compared with the estimated capacity required for storing the L2P table. Whether the pre-determined capacity of the buffer memory for storing the L2P table is not smaller than the estimated capacity required for storing the L2P table is checked. If it is determined that the pre-determined capacity of the buffer memory for storing the L2P table is not smaller than the estimated capacity required for storing the L2P table, the full-table storage mode is selected, and the FTL is established in the buffer memory being a DRAM-type buffer memory. If the pre-determined capacity of the buffer memory for storing the L2P table is smaller than the estimated capacity required for storing the L2P table, then whether the SSD includes a buffer memory is checked. If it is determined that the pre-determined capacity of the buffer memory for storing the L2P table is smaller than the estimated capacity required for storing the L2P table, a partial-table storage mode is selected, and part of the FTL is established in the buffer memory, and the remaining part is established in the flash memory array. If it is determined that the SSD does not include any buffer memories, then a flash memory storage mode is selected, and the FTL is established in the flash memory array.

According to another object of the present invention, a method for dynamically establishing a translation layer of an SSD is provided. Based on the part of the DRAM reserved by the host, the storage mode of the FTL can be dynamically selected to increase the access speed.

To achieve the above object of the present invention, a method for dynamically establishing a translation layer of an SSD is disclosed in a second embodiment of the present invention. An SSD is activated. A memory capacity of a buffer memory is obtained. A memory capacity of a flash memory array is obtained to form an estimated capacity required for storing the L2P table. The pre-determined capacity of the buffer memory for storing the L2P table is compared with the estimated capacity required for storing the L2P table. Whether the pre-determined capacity of the buffer memory for storing the L2P table is smaller than the estimated capacity required for storing the L2P table is checked. If the pre-determined capacity of the buffer memory for storing the L2P table is smaller than the estimated capacity required for storing the L2P table, then whether the SSD does not include any buffer memories is checked. If it is determined that the SSD does not include any buffer memories, when whether part of the DRAM is reserved by the host for the SSD is checked. If it is determined that part of the DRAM is reserved by the host for the SSD, then the host storage mode is selected, and the FTL is established in the part of the DRAM reserved by the host. If it is determined that no part of the DRAM is reserved by the host, then the flash memory storage mode is selected for the establishment of the FTL. If it is determined that the SSD includes a buffer memory, then the partial-table storage mode is selected, part of the FTL is established in the buffer memory, and the remaining part is established in the part of the DRAM reserved by the host.

The above and other aspects of the invention will become better understood with regard to the following detailed description of the preferred but non-limiting embodiment(s). The following description is made with reference to the accompanying drawings.

DETAILED DESCRIPTION OF THE INVENTION

The technologies and effects adopted in the present invention to the abovementioned objects are described below in a number of exemplary embodiments with accompanying drawings.

Figure 1:
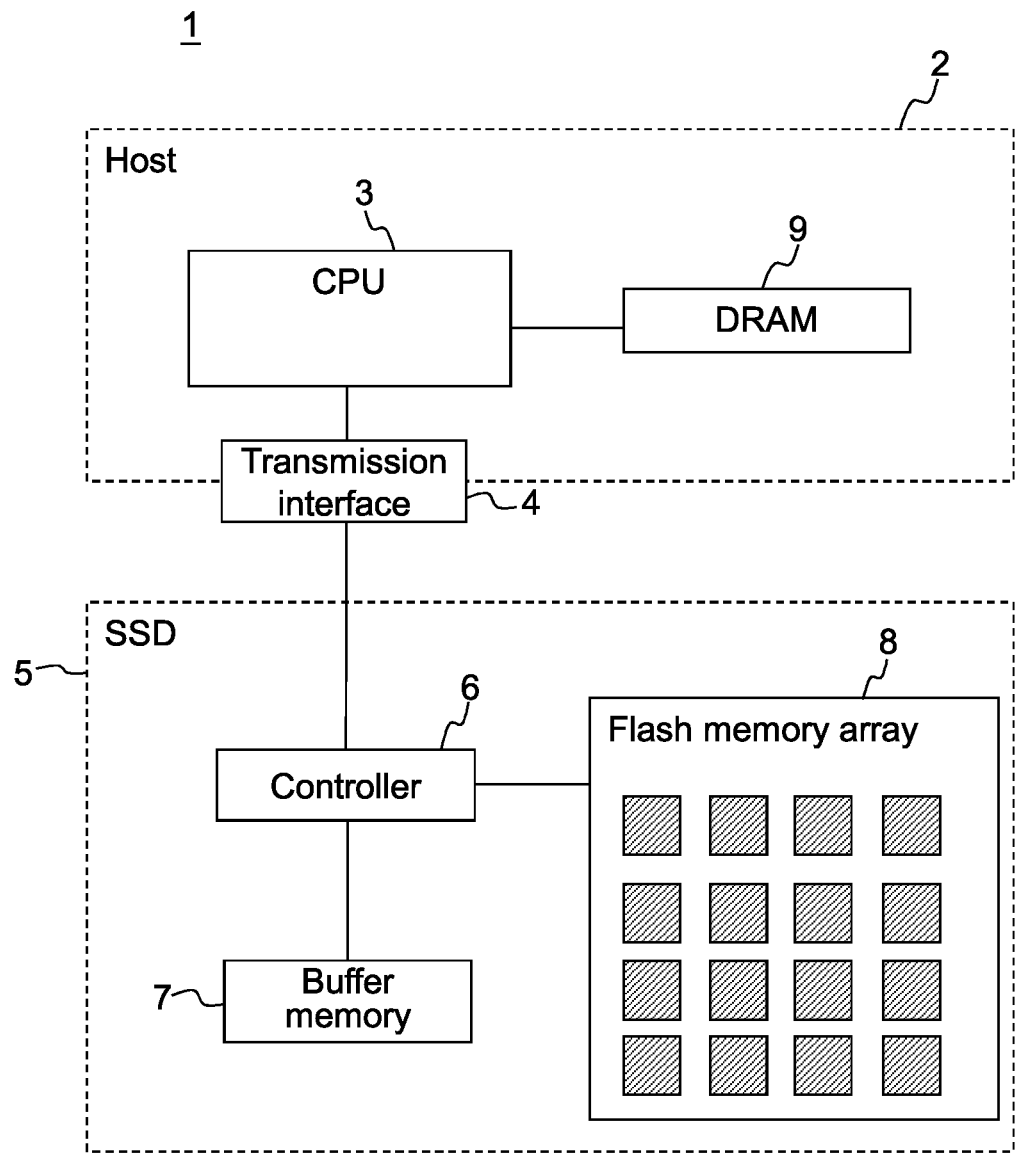
FIG. 1 is a functional block diagram of an electronic device storage system in the prior art.
Figure 2:
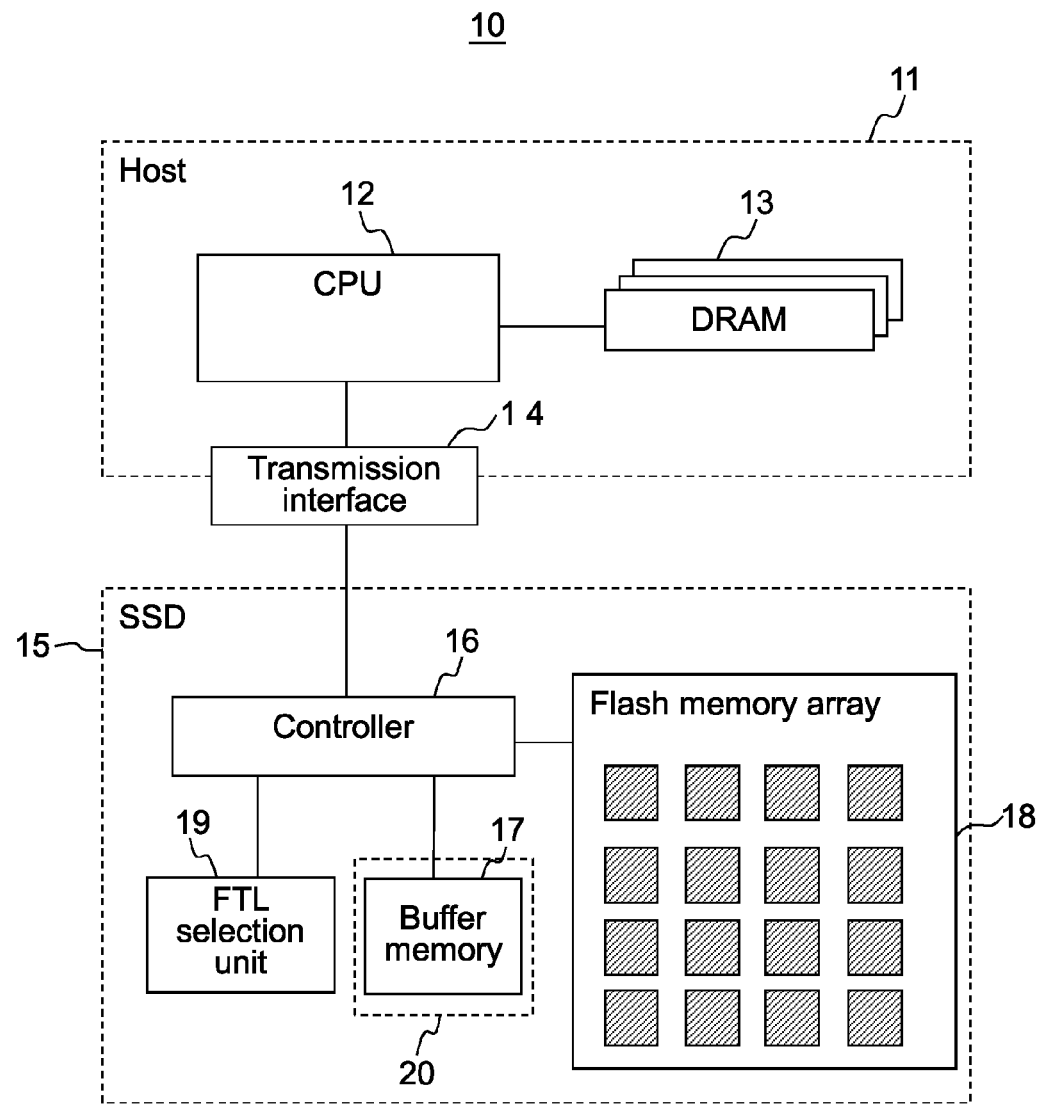
FIG. 2 is a functional block diagram of an electronic device storage system of the present invention.

Referring to FIG. 2, a functional block diagram of an electronic device storage system 10 of the present invention is shown. As illustrated in FIG. 2, the host 11 of the electronic device storage system 10 includes a CPU 12 and a dynamic random access memory (DRAM) 13. The CPU 12, in conjunction with the DRAM 13, sends the logical address of the accessed data to a solid state disk (SSD) 15 connected to a transmission interface 14. The SSD 15 includes a controller 16 and a buffer memory 17. The controller 16, in conjunction with the buffer memory 17, receives the logical address of the accessed data from the host 11, accesses data from the physical address of the flash memory array 18 corresponding to the logical address, and sends the accessed data to the DRAM 13 for the host 2 to use. In the present invention, the SSD 15 further includes a translation layer selection unit 19. When the SSD 15 is activated, the translation layer selection unit 19 dynamically selects the position for the establishment of a flash translation layer (FTL).

When the electronic device storage system 10 of the present invention activates the SSD 15, the controller 16 estimates the capacity required for forming an L2P table according to the memory capacity of the flash memory array 18. The translation layer selection unit 19 compares the pre-determined capacity of the buffer memory 17 for storing the L2P table with the estimated capacity required for storing the L2P table to determine the position for the establishment of the FTL. Since the access speed of the DRAM-type buffer memory 17 is 10 times faster than that of the flash memory, the translation layer selection unit 19 preferably establishes the FTL in the buffer memory 17. The translation layer selection unit 19 compares the pre-determined capacity of the buffer memory 17 for storing the L2P table with the estimated capacity required for storing the L2P table. If it is determined that the pre-determined capacity of the buffer memory 17 for storing the L2P table is not smaller than the estimated capacity required for storing the L2P table, then the translation layer selection unit 19 selects the full-table storage mode (full L2P table mapping method), and establishes the entire FTL 20 in the buffer memory 17. The translation layer selection unit 19 further notices the controller 16 to read the management data of each data block from the flash memory array 18 to form an L2P table, which is entirely stored in the buffer memory 17. When the controller 16 receives the logical address of the accessed data from the host 11, the controller 16 controls the FTL for storing the L2P table in the buffer memory 17 to quickly access data from the physical address of data stored in the flash memory array 18 corresponding to the logical address of the accessed data.

Figure 3:
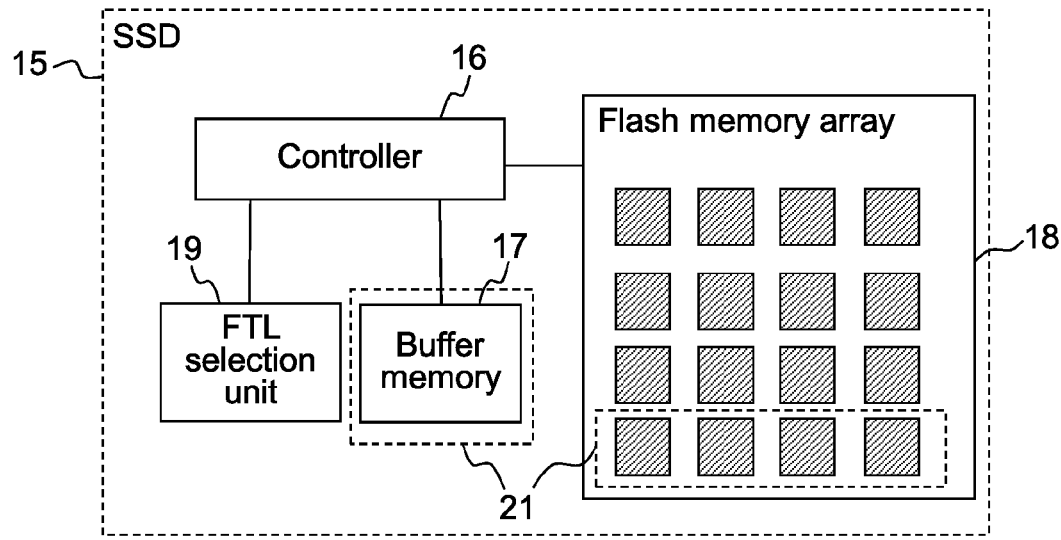
FIG. 3 is a functional block diagram of partial-table storage mode of the present invention.

Referring to FIG. 3, a functional block diagram of partial-table storage mode of the present invention is shown. When the SSD 15 is activated, the translation layer selection unit 19 compares the pre-determined capacity of the buffer memory 17 for storing the L2P table with the estimated capacity required for storing the L2P table. If the translation layer selection unit 19 determines that the pre-determined capacity of the buffer memory 17 for storing the L2P table is smaller than the estimated capacity required for storing the L2P table, the translation layer selection unit 19 further checks whether the SSD 15 includes a buffer memory 17. If the translation layer selection unit 19 determines that the SSD 15 includes a buffer memory 17, then the translation layer selection unit 19 selects the partial-table storage mode (partial L2P table mapping method), establishes part of the FTL 21 in the buffer memory 17, and establishes the remaining part of the FTL 21 in the flash memory array 18. The translation layer selection unit 19 further notices the controller 16 to read the management data of each data block from the flash memory array 18 to form an L2P table. The L2P table of commonly used data is stored in the buffer memory 17, and the L2P table of other data is stored in the flash memory array 18.

When accessing data, if the controller 16 controls the FTL and finds out that the corresponding L2P table of the accessed data does not exist in the buffer memory 17, the controller 16 needs to delete part of the L2P table originally stored in the buffer memory 17 to free the storage space. Then, the controller 16 reads the correspondence relationship of the data from the L2P table stored in the flash memory array 18, and stores the correspondence relationship to the freed storage space of the buffer memory 17 for the access of data. In the partial-table storage mode, data needs to be exchanged between the buffer memory 17 and the flash memory array 18. Thus, the access speed in the partial-table storage mode is slower than that in the full-table storage mode.

Figure 4:
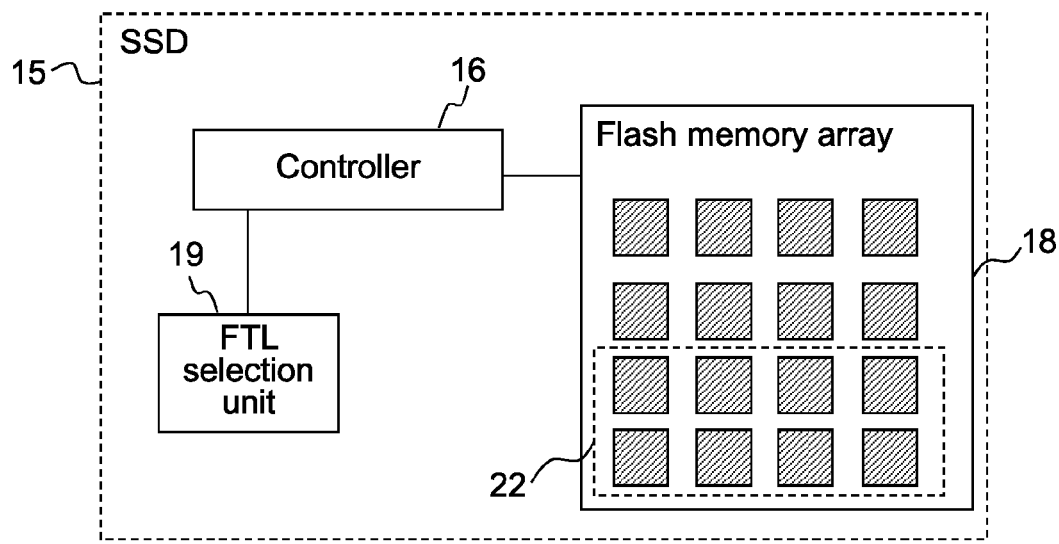
FIG. 4 is a functional block diagram of a flash memory storage mode the present invention.

Referring to FIG. 4, a functional block diagram of a flash memory storage mode the present invention is shown. The translation layer selection unit 19 of the present invention compares the pre-determined capacity of the buffer memory for storing the L2P table with the estimated capacity required for storing the L2P table. If the translation layer selection unit 19 determines that the pre-determined capacity of the buffer memory for storing the L2P table is smaller than the estimated capacity required for storing the L2P table, the translation layer selection unit 19 selects the flash memory storage mode (flash array L2P table mapping method) if the SSD 15 (such as flash drive or memory card) does not include any buffer memories. Then, the translation layer selection unit 19 establishes the entire FTL 22 in the flash memory array 18, and further notices the controller 16 to read the management data of each data block from the flash memory array 18 to form an L2P table stored in the flash memory array 18. When accessing data, the controller 16 controls the FTL to read data correspondence relationship from the L2P table stored in the flash memory array 18 and directly sends the correspondence relationship to the host. Since the access speed of the flash memory is slower than that of the buffer memory, the access speed of the SSD 15 will be affected. Thus, the flash memory storage mode is the ultimate selection in the present invention.

Figure 5:
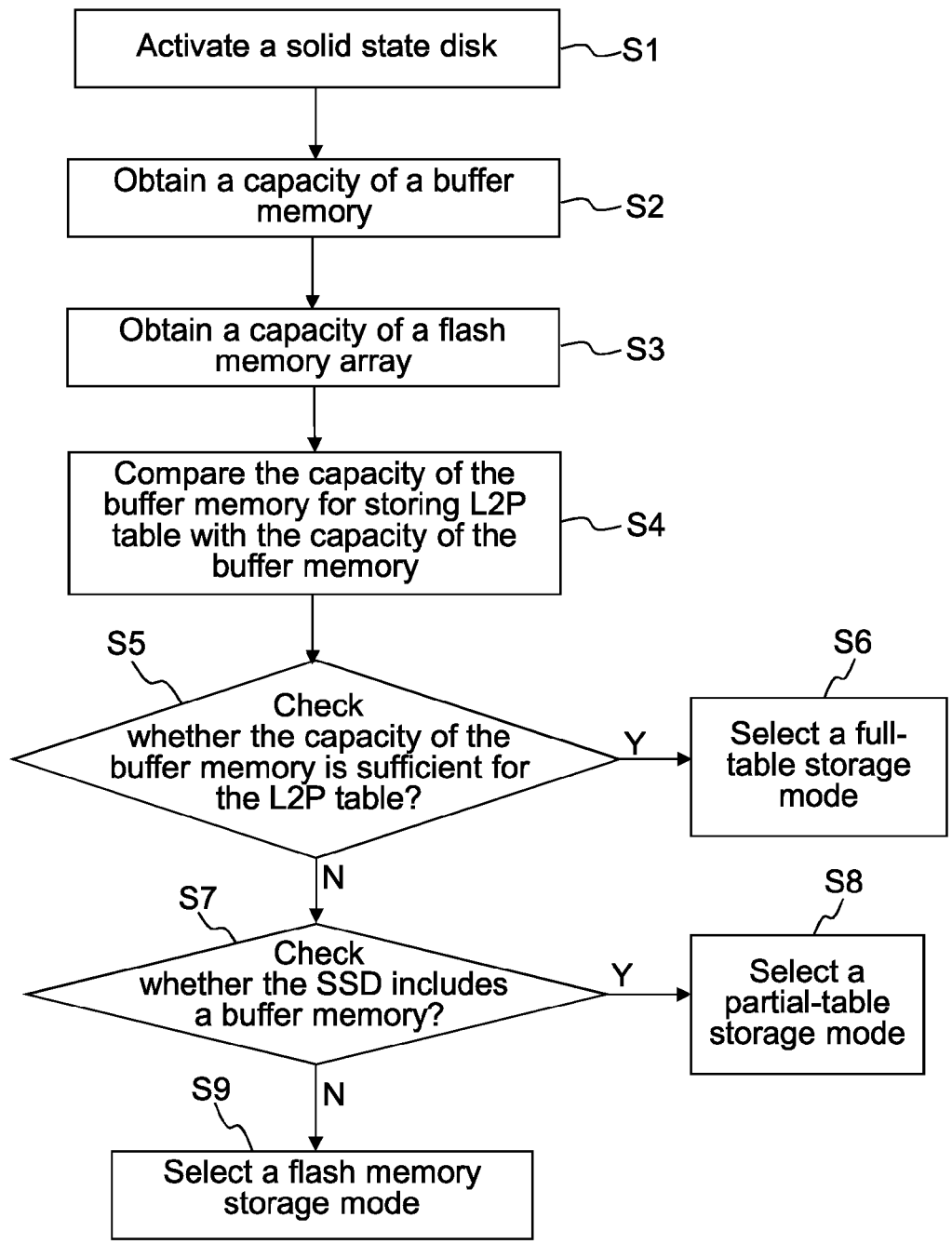
FIG. 5 is a flowchart of a method for dynamically establishing translation layer of an SSD according to a first embodiment of the present invention.

FIG. 5 is a flowchart of a method for dynamically establishing a translation layer of an SSD according to a first embodiment of the present invention. Detailed steps of the method for dynamically establishing a translation layer of an SSD according to a first embodiment of the present invention are described below. Firstly, in step S1, an SSD is activated. In step S2, a memory capacity of a buffer memory is obtained. In step S3, a memory capacity of a flash memory array is obtained to form an estimated capacity required for storing the L2P table. In step S4, a pre-determined capacity of the buffer memory for storing the L2P table is compared with the estimated capacity required for storing the L2P table. In step S5, whether the pre-determined capacity of the buffer memory for storing the L2P table is not smaller than the estimated capacity required for storing the L2P table is checked, that is, whether the pre-determined capacity of the buffer memory is sufficient for the L2P table is checked. If it is determined that the pre-determined capacity of the buffer memory for storing the L2P table is not smaller than the estimated capacity required for storing the L2P table, that is, the pre-determined capacity of the buffer memory is sufficient for the L2P table, then the method proceeds to step S6, the full-table storage mode is selected, and the entire FTL is established in the buffer memory. If the pre-determined capacity of the buffer memory for storing the L2P table is smaller than the estimated capacity required for storing the L2P table, that is, the pre-determined capacity of the buffer memory is insufficient for the L2P table, then the method proceeds to step S7. In step S7, whether the SSD includes a buffer memory is checked. If it is determined that the SSD includes a buffer memory, then the method proceeds to step S8. In step S8, the partial-table storage mode is selected, that is, part of the FTL is established in the buffer memory and the remaining part is established in the flash memory array. If it is determined that the SSD does not include any buffer memories, then the method proceeds to step S9. In step S9, the flash memory storage mode is selected, that is, the entire FTL is established in the flash memory array.

According to the method for dynamically establishing a translation layer of an SSD disclosed in the first embodiment of the present invention, when the SSD is activated, the FTL is preferably established in the buffer memory to increase the access speed according to the state in the buffer memory of the SSD and the comparison between the capacity of the buffer memory and that of the L2P table, and the storage mode of the L2P table is dynamically selected. Thus, when the buffer memory is broken or partly damaged, the establishing position of the FTL is suitably adjusted, such that normal operation of the SSD can be maintained and the lifespan of the SSD can be prolonged.

Figure 6:
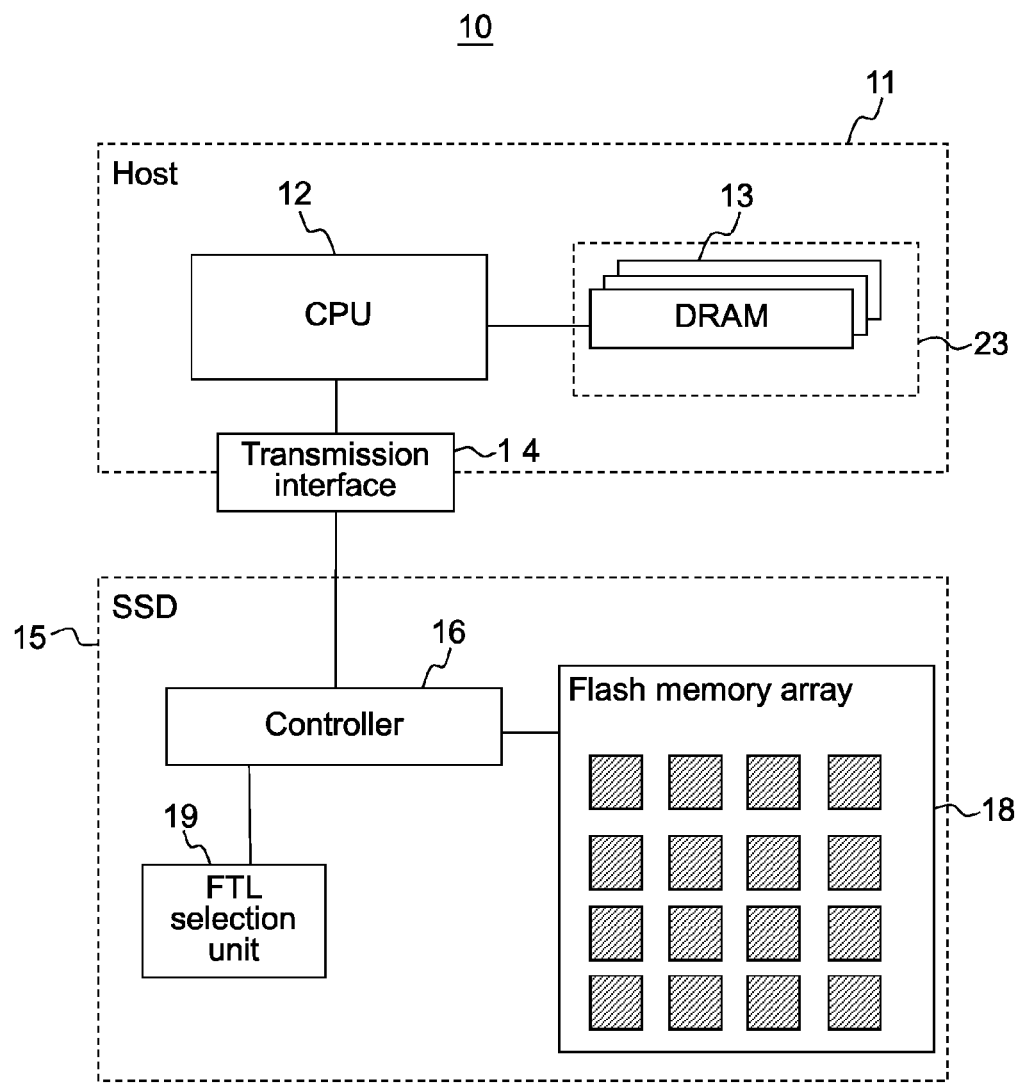
FIG. 6 is a functional block diagram of a host memory storage mode of the present invention.

As indicated in FIG. 6, a functional block diagram of a host memory storage mode of the present invention is shown. Since the access speed of the flash memory array 18 is slow, some hosts 11 will reserve part of the DRAM 13 for the SSD 15 to use. Although the SSD 15 can only exchange data with the DRAM 13 during the operation gaps of the host 11, the access speed of the DRAM 13 is still faster than that of the flash memory array 18. According to the method for dynamically establishing a translation layer of an SSD disclosed in the second embodiment of the present invention, when the SSD 15 is activated, the translation layer selection unit 19 checks whether the pre-determined capacity of the buffer memory for storing the L2P table is smaller than the estimated capacity required for storing the L2P table. If it is determined that the pre-determined capacity of the buffer memory for storing the L2P table is smaller than the estimated capacity required for storing the L2P table, the translation layer selection unit 19 further checks whether the SSD 15 includes a buffer memory. If it is determined that the SSD 15 does not include any buffer memories, the translation layer selection unit 19 further checks whether the host 11 reserves part of the DRAM 13 for the SSD 15 to use. If it is determined that part of the DRAM 13 is reserved by the host 11, the host storage mode is selected, that is, the FTL 23 is established in the part of the DRAM 13 reserved by the host 11 to increase the access speed. If the DRAM 13 is not reserved, the flash memory storage mode is selected.

According to the method for dynamically establishing a translation layer of an SSD disclosed in the second embodiment of the present invention, the translation layer selection unit 19 compares the pre-determined capacity of the buffer memory for storing the L2P table with the estimated capacity required for storing the L2P table. if it is determined that the pre-determined capacity of the buffer memory for storing the L2P table is smaller than the estimated capacity required for storing the L2P table, the translation layer selection unit 19 further checks whether the SSD 15 includes a buffer memory. If it is determined that the SSD 15 includes a buffer memory, the translation layer selection unit 19 selects the partial-table storage mode, part of the FTL is established in the buffer memory, and the remaining part is established in the part of the DRAM 13 reserved by the host 11 to increase the data access speed.

Figure 7:
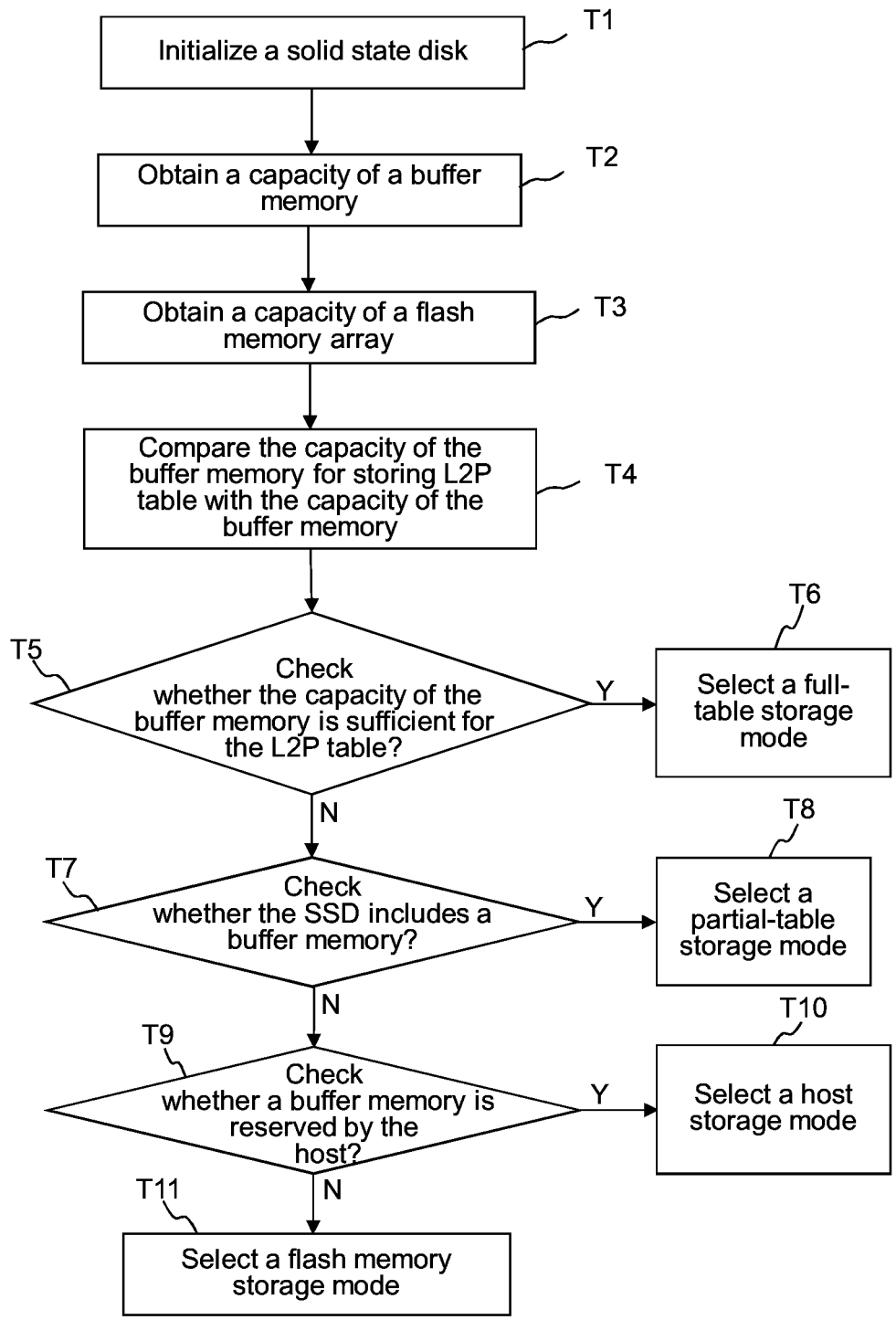
FIG. 7 is a flowchart of a method for dynamically establishing translation layer of an SSD according to a second embodiment of the present invention.

FIG. 7 is a flowchart of a method for dynamically establishing a translation layer of an SSD according to a second embodiment of the present invention. Detailed steps of the method for dynamically establishing translation layer of an SSD according to a second embodiment of the present invention are described below. Step T1 of activating an SSD to step T8 of selecting the partial-table storage mode of the method for dynamically establishing a translation layer of the SSD of the second embodiment of the present invention are the same as step S1 to step S8 of the method for dynamically establishing a translation layer of the SSD of the first embodiment of the present invention. The method for dynamically establishing a translation layer of the SSD of the second embodiment of the present invention further includes steps T9-T11. In step T9, whether the host reserves part of the DRAM for the SSD to use is checked. If it is determined that part of the DRAM is reserved for the SSD to use, then the method proceeds to step T10. In step T10, the host storage mode is selected, that is, the FTL is established in the part of the DRAM reserved by the host. If it is determined that the host does not reserve any of the DRAM, then the method proceeds to step T11. In step T11, the flash memory storage mode is selected, and the entire FTL is established in the flash memory array.

According to the method for dynamically establishing a translation layer of the SSD disclosed in the second embodiment of the present invention, by checking whether the host reserves part of the DRAM for the SSD to use and checking the state of the DRAM of the host, the FTL which should originally be established in the flash memory array can now be dynamically adjusted and established in the part of the DRAM reserved by the host to increase the access speed.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method for dynamically establishing a translation layer of a solid state disk (SSD), comprising steps of:
   activating an SSD;
   obtaining a memory capacity of a buffer memory;
   obtaining a memory capacity of a flash memory array to form an estimated capacity required for storing an L2P table;
   comparing the pre-determined capacity of the buffer memory for storing the L2P table with the estimated capacity required for storing the L2P table;
   checking whether the pre-determined capacity of the buffer memory for storing the L2P table is not smaller than the estimated capacity required for storing the L2P table, and selecting a full-table storage mode for the establishment of a flash translation layer (FTL) if it is determined that the pre-determined capacity of the buffer memory for storing the L2P table is not smaller than the estimated capacity required for storing the L2P table.

2. The method for dynamically establishing the translation layer of an SSD according to claim 1, wherein in the full-table storage mode, the FTL is established in the buffer memory.

3. The method for dynamically establishing the translation layer of SSD according to claim 1, wherein the buffer memory is a DRAM-type buffer memory.

4. The method for dynamically establishing the translation layer of an SSD according to claim 1, wherein if it is determined that the pre-determined capacity of the buffer memory for storing the L2P table is smaller than the estimated capacity required for storing the L2P table, then whether the SSD comprises a buffer memory is checked, and a partial-table storage mode is selected for the establishment of the FTL if it is determined that the SSD comprises a buffer memory.

5. The method for dynamically establishing translation layer of an SSD according to claim 4, wherein in the partial-table storage mode, part of the FTL is established in the buffer memory, and the remaining part is established in the flash memory array.

6. The method for dynamically establishing translation layer of an SSD according to claim 4, wherein if it is determined that the SSD does not include any buffer memory, then the flash memory storage mode is selected for the establishment of the FTL.

7. The method for dynamically establishing translation layer of an SSD according to claim 6, wherein in the flash memory storage mode, the FTL is established in the flash memory array.

8. A method for dynamically establishing translation layer of an SSD, comprising steps of:
   activating an SSD;
   obtaining a memory capacity of a buffer memory;
   obtaining a memory capacity of a flash memory array to form an estimated capacity required for storing an L2P table;
   comparing the pre-determined capacity of the buffer memory for storing the L2P table with the estimated capacity required for storing L2P table;
   checking whether the pre-determined capacity of the buffer memory for storing the L2P table is not smaller than the estimated capacity required for storing the L2P table, and selecting a full-table storage mode for the establishment of a flash translation layer (FTL) if it is determined that the pre-determined capacity of the buffer memory for storing the L2P table is not smaller than the estimated capacity required for storing the L2P table;
   checking whether the SSD comprises a buffer memory if it is determined that the pre-determined capacity of the buffer memory for storing the L2P table is not smaller than the estimated capacity required for storing the L2P table;
   checking whether the host reserves part of the DRAM for the SSD, and selecting a host storage mode for the establishment of the FTL if it is determined that the host reserves part of the DRAM for the SSD.

9. The method for dynamically establishing translation layer of an SSD according to claim 8, wherein in the host storage mode, the FTL is established in the part of the DRAM reserved by the host.

10. The method for dynamically establishing translation layer of an SSD according to claim 8, wherein if it is determined that the host does not reserve a DRAM, then a flash memory storage mode is selected for the establishment of the FTL.

11. The method for dynamically establishing translation layer of an SSD according to claim 8, wherein if it is determined that the SSD comprises a buffer memory, then a partial-table storage mode is selected for the establishment of the FTL.

12. The method for dynamically establishing translation layer of an SSD according to claim 11, wherein in the partial-table storage mode, part of the FTL is established in the buffer memory, and the remaining part is established in the part of the DRAM reserved by the host.

* * * * *